Patented Mar. 7, 1939

2,149,703

UNITED STATES PATENT OFFICE 2,149,703

AZO DYES

Eugene A. Markush, Jersey City, Mark S. Mayzner, Asbury Park, and Julius Miller, Newark, N. J., assignors to Pharma Chemical Corporation, New York, N. Y., a corporation of New York No Drawing. Application February 11, 1937, Serial No. 125,222

8 Claims. (Cl. 260—178)

Our invention relates to coloring matters, or dyes, and refers particularly to compounds of this general classification adaptable for coloring or dyeing cellulosic fibers.

We have found that valuable compounds suitable for the coloring, or dyeing, of cellulosic fibers can be produced by combining a coupling component such as the arylides of beta-hydroxy-naphthoic acid with a diazotized amine having the general formula:

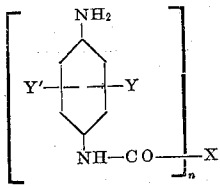

in which Y is alkyl or alkoxy or aralkyl and Y' is a halogen substituent, and X represents an aliphatic residue of a not less than four carbon and not more than six carbon acid and "$n$" is 1 when this aliphatic group is the residue of a monobasic acid and "$n$" is 2 when the aliphatic group is the residue of a dibasic acid.

The compounds of our invention may be produced in substance or upon the cellulosic fiber.

In producing the compounds of our invention in substance, the diazotized compound is combined with the coupling component while, in producing them upon the fiber, the fiber may be first treated, or impregnated, with the coupling component and the diazotized compound applied thereto, or the fiber treated, or impregnated, with the coupling component may be converted into our new compound by the application of a stabilized compound of the diazotized product and then subjected to an acid treatment, or the stabilized compound of the diazotized product may be mixed with the coupling component and this mixture applied to the fiber and developed thereon by an acid treatment.

We give the following as an example of the production of a compound of our invention by applying a stabilized compound of the diazotized product and a coupling component:

Example I

Twelve parts 4-chlor-5-butyryl-amino-2-diazoimino-proline-anisole are mixed with 7.2 parts o-anisidid of beta-hydroxy-naphthoic acid. This mixture is pasted in 500 parts of water and stirred and heated to 40° C., until a clear solution results. Acetic or formic acid is added slowly until the solution shows excess of acid and the heating continued. A violet precipitate separates out. The temperature is maintained at 80°–90° C. until no further dye is formed. The dye is filtered, washed thoroughly, and dried. The pigment obtained has excellent properties. Its formula is probably:

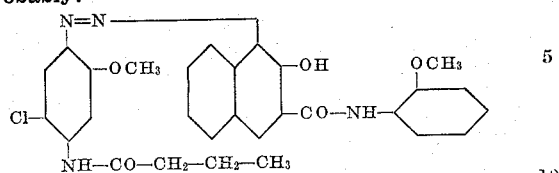

We give the following as an example of the production of a compound of our invention in substance employing a diazotized compound and a coupling component:

Example II

One mol. of the sodium salt of beta-hydroxy-naphthoic acid-ortho-toluidide are dissolved in about 800 parts of water and mixed with an excess of a sodium acetate solution. Into the solution thus prepared is run a diazo compound produced in the known manner from 1 mol. of 4-chlor-5-butyryl-amino-2-diazoimino-proline-anisole. Coupling takes place and the dyestuff filtered and dried.

Example III

Twelve parts of 4-chlor-5-butyryl-amino-2-diazoimino-proline-anisole are intimately mixed with seven parts beta-hydroxy-naphthoic-acid-ortho-toluidide and stirred with 100 parts of water to a thin paste.

To this is now added eighteen parts sodium hydrate solution 30° Bé. and 25 parts "cellosolve". The mixture is heated gently until a clear solution results (about 50° C.) and then thickened with 300 parts of starch-tragacanth paste. The paste is printed on the fiber in the well-known manner. After drying, either on the can or in warm air, it is developed in a live steam ager with acetic acid for three to five minutes or by immersing in a hot bath containing salt and acetic or formic acid, until a maximum intensity is reached. The developed material is then soaped hot, rinsed well, and dried. A beautiful reddish violet is obtained.

We give the following as an example of the production of one of our compounds by the padding method:

Example IV

The material is padded with 100 parts beta-hydroxy-naphthoic-acid-ortho-toluidide in the usual manner.

The diazonium is prepared by pasting 35 parts of 4-chlor-5-butyryl-amino-2-anisidine in 200 parts of water and 30 parts of hydro-chloride acid 20° Bé. Cool to 5° C. by means of ice and add slowly a solution of 7 parts sodium nitrite dissolved in 35 cc. of water. The mineral acid of the greenish yellow diazonium solution, when finished, is eliminated by the addition of sodium acetate. If the padded material is cloth, the diazonium may be printed on by thickening with starch tragacanth. Padded material or hank may be developed in the usual immersion method. After printing or immersing with the diazonium the cloth is aged, soaped, rinsed, and dried.

We give the following as an example of padding with stabilized diazoniums and naphthoic acid arylamides:

*Example V*

The padding method can also be used by applying stabilized diazoniums. The material is padded with 100 parts beta-hydroxy-naphthoic-acid-ortho-toluidide in the usual manner.

The diazonium is prepared in the known manner from 35 parts of 4-chlor-5-butyryl-amino-2-diazo-imino-proline-anisole. The solution is neutralized with sodium acetate. The diazonium may be printed on by thickening with starch tragacanth. After printing the cloth is dried, developed in a live steam ager with acetic acid or immersed in a solution containing acetic acid or formic acid, then soaped, rinsed, and dried.

We give the following as further examples of the production of compounds of our invention:

*Example VI*

10 parts of the diazo-imino compound obtained by condensing in alkaline solution the diazonium of 4-chlor-5-amino-2-butyryl-amino-anisole of the formula

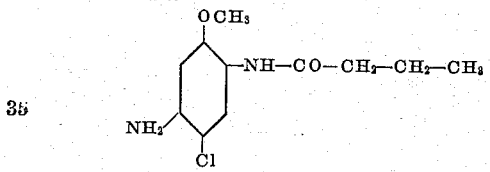

with hydroxy-proline, subsequently salted, filtered, and dried, are mixed with 8 parts of beta-hydroxy-naphthoic-acid-anilide. The mixture, if treated, printed, and developed as previously described, yields a bright violet shade.

This mixture may be used also to obtain the dye in substance when the solution is treated with acetic or formic acid as previously described. The pigment is a brilliant reddish-blue powder with excellent properties. Its probable formula is:

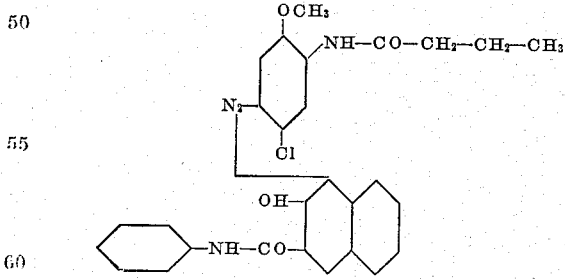

As in Example I, the dye may also be prepared by combining the diazonium solution with the coupling component or on the goods by the diazonium and the padded material in the manner previously mentioned.

*Example VII*

A mixture of 10 parts 1-methyl-2-diazo-imino-piperidin-carboxylic-acid-4-chlor-5-valeri-amino-benzol and 6.9 parts beta-hydroxy-naphthoic acid chlor-anilide is pasted up with 500 parts of water and 18 parts of sodium hydrate 80° Bé. The mixture is thoroughly stirred and heated to 40° C. until a clear solution results. Acetic or formic acid is added slowly until the solution shows excess of acid and the heating continued. The dye separates out. The temperature is maintained at 80°–90° C. until no further dye is formed, and the mixture filtered, washed thoroughly, and dried. The reddish violet pigment obtained has excellent properties. Its formula is probably:

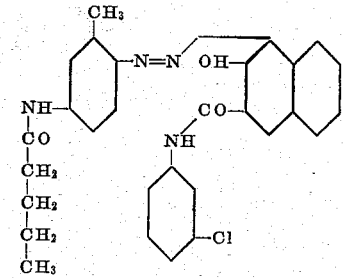

*Example VIII*

Red violet dye is obtained by using as above a mixture of 10 parts 4-chlor-5-iso-butyryl-amino-1-methyl-2-diazo-imino-benzol-b-hydroxy-proline and 7 parts beta-hydroxy-naphthoic acid-ortho-toluidide. The probable formula is:

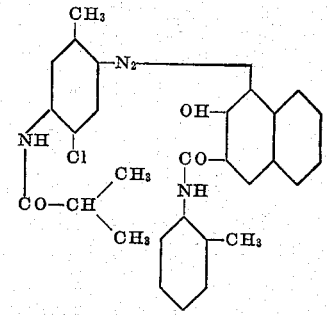

*Example IX*

Clear shade is obtained by applying a mixture of 10 parts 1-chlor-4-methyl-5-(methyl-ethyl-acetyl)-amino-2-diazo-imino-proline-benzol and 7 parts beta-hydroxy-naphthoic acid ortho-toluidide. The probable formula of the dye is:

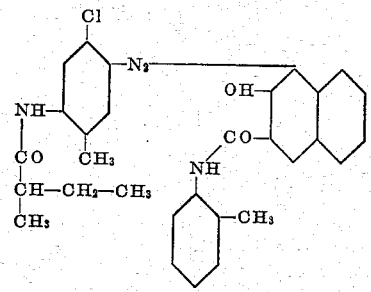

*Example X*

A water insoluble azo dye which comprises coupling 2.3 hydroxy-naphthoic acid xylidide with the diazo compound of 4-brom-5-capryl-amino-1-methoxy-2-amino-benzol. The formula of the dye is:

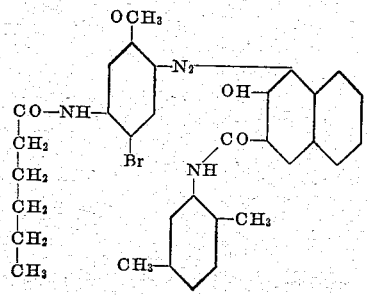

Example XI

A water insoluble azo dye which comprises coupling 2.3 hydroxy-naphthoic acid-toluidide with butylene-dicarboxyl-di-(4-amino- 5 - chlor-2-methoxy-1-amino-benzol). The general formula of the dye is:

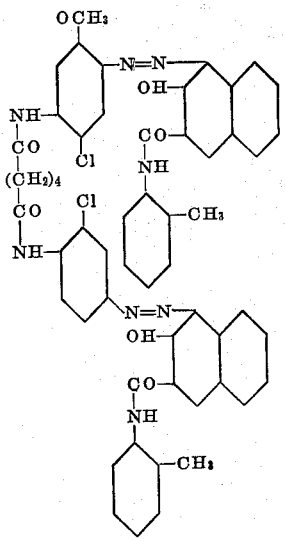

The following arylamides of 2.3 hydroxy-1-naphthoic acid may also be used as coupling components:

2'3' hydroxy-naphthoic acid-o-anisidide.
2'3' hydroxy-naphthoic acid-2-naphthylamide.
2'3' hydroxy-naphthoic acid-3-nitroanilide.
2'3' hydroxy-naphthoic acid-4-chlor-2-toluidide.

By "stabilizers", we mean those compounds which combine with diazotized compounds having a stabilizing effect thereon and which can be split off by acid treatment.

The stabilizers are not limited to those cited in the examples, and stabilized diazoniums of the following nature may also be used:

2.5-dimethoxy-4-capyryl-amino-1-diazo-imino-benzol-methyl-amino-acetic acid
2.5 - diethoxy - 4 - butyryl - amino - diazo - imino-benzol-dicarboxyl piperidine
2.5 - dimethoxy - 4 - isobutyryl - amino - 1 - diazo-imino-benzol-4-sulfo-2-amino-benzoic acid We do not limit ourselves to the materials, quantities, times, temperatures, and steps of procedure specifically set forth as these are given solely for the purpose of clearly defining our invention.

What we claim is:

1. The process of producing water-insoluble colored compounds which comprises combining an arylide of beta-hydroxy-naphthoic acid with a diazotized amine, the amine having the general formula:

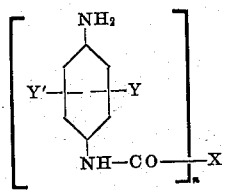

in which Y is alkyl or alkoxy and Y' is a halogen substituent, and X represents an aliphatic radical of not less than four carbon and not more than six carbon acid and "$n$" is 1 when this aliphatic group is the radical of a monobasic acid and "$n$" is 2 when the aliphatic group is the radical of a dibasic acid.

2. Colored compounds having the general formula:

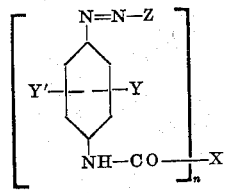

in which Y is alkyl or alkoxy, Y' is a halogen substituent, X represents an aliphatic radical of a not less than four carbon and not more than six carbon acid, "$n$" is 1 when this aliphatic group is the radical of a monobasic acid and is 2 when the aliphatic group is the radical of a dibasic acid, and Z is the radical of an arylide of beta-hydroxy-naphthoic acid.

3. The process of producing water-insoluble colored compounds which comprises mixing 4-chlor-5-butyryl-amino-2-diazo-imino-proline-anisole with o-anisidid of beta-hydroxy-naphthoic acid, the colored compound formed by subjecting said mixture to acid treatment having the formula:

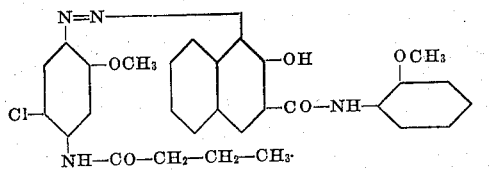

4. The process of producing water-insoluble colored compounds which comprises reacting 2.3-hydroxy-naphthoic-acid-toluidid with diazotized butylene-dicarboxyl-di-(4-amino-5-chlor-2-methoxy-1-amino-benzol), the coloring matter having the formula:

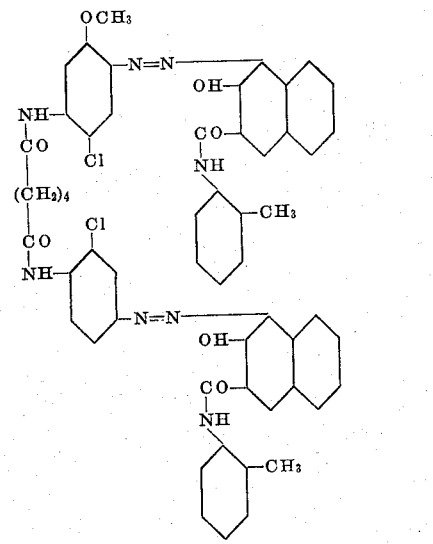

5. Water-insoluble colored compounds formed according to the process of claim 1.
6. Cellulosic fibers imprinted with the water-insoluble compounds of claim 1.
7. Cellulosic fibers imprinted with the water-insoluble compounds of claim 3.
8. Cellulosic fibers imprinted with the water-insoluble compounds of claim 4.

EUGENE A. MARKUSH.
MARK S. MAYZNER.
JULIUS MILLER.